(12) United States Patent
Lieven et al.

(10) Patent No.: US 8,550,401 B2
(45) Date of Patent: Oct. 8, 2013

(54) MODULAR FLOOR SECTION FOR AIRCRAFT

(75) Inventors: Patrick Lieven, Fronton (FR); Daniel Bellet, Saint-Lys (FR)

(73) Assignee: Airbus Operations S.A.S., Toulouse (FR)

( * ) Notice: Subject to any disclaimer, the term of this patent is extended or adjusted under 35 U.S.C. 154(b) by 125 days.

(21) Appl. No.: 13/133,575

(22) PCT Filed: Dec. 8, 2009

(86) PCT No.: PCT/FR2009/052437
§ 371 (c)(1),
(2), (4) Date: Aug. 4, 2011

(87) PCT Pub. No.: WO2010/067001
PCT Pub. Date: Jun. 17, 2010

(65) Prior Publication Data
US 2011/0278396 A1    Nov. 17, 2011

(30) Foreign Application Priority Data
Dec. 9, 2008    (FR) ...................................... 08 58408

(51) Int. Cl.
*B64C 1/00* (2006.01)
*B64C 1/22* (2006.01)
*E04F 15/00* (2006.01)

(52) U.S. Cl.
USPC ..... 244/119; 244/117 R; 244/131; 244/118.1; 244/120; 52/177

(58) Field of Classification Search
USPC .................. 244/119, 117 R, 131, 118.1, 120; 52/177, 583.1, 591.4, 591.5
See application file for complete search history.

(56) References Cited

U.S. PATENT DOCUMENTS

| | | | | |
|---|---|---|---|---|
| 4,951,992 A | * | 8/1990 | Hockney | 296/204 |
| 6,224,142 B1 | * | 5/2001 | McCormack | 296/191 |

(Continued)

FOREIGN PATENT DOCUMENTS

| | | |
|---|---|---|
| EP | 1 614 622 | 1/2006 |
| WO | 2005 095205 | 10/2005 |

OTHER PUBLICATIONS

International Search Report Issued Mar. 4, 2010 in PCT/FR09/052437 filed Dec. 8, 2009.

*Primary Examiner* — Tien Dinh
*Assistant Examiner* — Michael Wang
(74) *Attorney, Agent, or Firm* — Oblon, Spivak, McClelland, Maier & Neustadt, L.L.P.

(57) ABSTRACT

A floor section for a vehicle cabin includes juxtaposed profiled elements of identical cross section. Each profiled element includes a mainly planar elongated cross member and a generally flat elongated panel. The cross member includes a lower stiffener, is positioned in a transverse vertical plane, and is attachable at two extremities to a vehicle frame. The elongated panel is positioned in a horizontal plane and includes an overlap region along one longitudinal edge and a bearing region along another longitudinal edge. The overlap region and the bearing region are of similar width and of total thickness less than or equal to a mean panel thickness. The panel is perpendicular to the cross member, and a bearing region underside is coplanar with a lower face of the elongated panel and is secured to the cross member at two or more points substantially in line with a middle of the bearing region.

9 Claims, 2 Drawing Sheets

(56) References Cited

U.S. PATENT DOCUMENTS

| | | | |
|---|---|---|---|
| 6,324,796 B1 * | 12/2001 | Heath | 52/177 |
| 6,619,002 B2 * | 9/2003 | Pettit | 52/177 |
| 7,047,697 B1 * | 5/2006 | Heath | 52/177 |
| 7,900,416 B1 * | 3/2011 | Yokubison et al. | 52/592.1 |
| 8,074,928 B2 * | 12/2011 | Haack et al. | 244/119 |
| 8,226,034 B2 * | 7/2012 | Huber et al. | 244/119 |
| 2002/0148382 A1 | 10/2002 | Norton et al. | |
| 2003/0196567 A1 | 10/2003 | Norton et al. | |
| 2005/0211840 A1 | 9/2005 | Grether et al. | |
| 2006/0006283 A1 | 1/2006 | Vetillard et al. | |
| 2010/0319294 A1 * | 12/2010 | Courey et al. | 52/591.4 |
| 2012/0011785 A1 * | 1/2012 | Kulas | 52/177 |

* cited by examiner

MODULAR FLOOR SECTION FOR AIRCRAFT

FIELD OF THE INVENTION

The present invention relates to the field of aircraft structures. It relates more specifically to a floor structure and a method of assembling a floor structure in a section of aircraft fuselage.

BACKGROUND OF THE INVENTION

An aircraft fuselage comprises in a known way a hull structure 1 (FIG. 2a) and a floor 2 (FIG. 2b), and is commonly produced by assembling two or more sections.

Each section generally comprises, for hull structure 1, transverse stiffeners, known as frames 3, longitudinal stiffeners, known as stringers 4, attached on these frames 3, and a skin in the form of one or more metal or composite sheets shaped according to the desired section, attached to the frames 3 and stringers 4.

The frames 3 are positioned along sections of the fuselage substantially perpendicular to a longitudinal axis X of the aircraft (FIG. 2a). The stringers 4 extend between the frames 3 substantially along the longitudinal axis X.

The floor 2 is a primary structure inside the hull structure 1 of the fuselage.

Currently and in a known way, a floor section is formed by an assembly of cross members 5, rails 6 (FIG. 2b) secured by screwing, riveting, welding or gluing, depending on the materials, and supporting horizontal covering elements not shown.

The cross members 5 are generally straight and horizontal, in an aircraft reference space, and extend perpendicular to the longitudinal axis X, along a transverse axis Y of the aircraft. Their role is to dissipate the forces related to the load on the floor 2 towards the hull structure 1 of the fuselage. The rails 6 extend along the longitudinal axis X. They are used to fix furniture elements, for example seats.

To achieve the assembly of the hull structure 1 and floor 2, numerous mechanical connections must be made between them.

For example, in order to dissipate forces (mostly the mass of a load on the floor) to the fuselage's hull structure 1, the cross members 5 are attached to the frames 3 at their extremities and frequently by means of braces 7, each bearing a different point 8 of the frame.

In addition, each floor cross member 5 must be lined up accurately to a frame 3 in order to be attached to it.

This relative positioning of the floor 2 with respect to the hull structure 1 is, in the usual embodiments, indeterminate and requires a methodical realization of both the 2 floor and the fuselage when the floor is installed pre-assembled in each section. The frames 5 and cross members 3 are structural elements intended to dissipate significant force flows and each therefore has a high rigidity. As a result, these elements are not able to deform so as to adapt to any misalignments. Compensating for positioning errors during manufacture is therefore difficult.

Finally, according to a recent development, the increasingly widespread use of composites for manufacturing fuselage structures means a fuselage hull structure 1 can be realized in one piece, circumferentially closed, known as a full-barrel composite fuselage. Therefore, the floor 2 and hull structure 1 can no longer be assembled to form a fuselage section by the traditional method of assembling the floor on a lower portion of the structure, known as the tub, before completion of the frames.

Moreover, the positioning of a previously assembled floor in the circumferentially closed hull structure leads to even greater difficulties related to manufacturing tolerances and assembly indeterminacy, since the hull structure closed in this way is extremely rigid and it is impossible to compensate for misalignments through the elastic deformation of the structure.

There is therefore a need for a floor structure able to allow the cost-efficient assembly of said floor in a circumferentially closed hull structure, and allowing slight misalignments between the floor cross members and the frames to be compensated for.

The object of this invention is to propose a new aircraft cabin floor structure associated with a new method of assembling such a floor.

BRIEF SUMMARY OF THE INVENTION

To this end the invention firstly envisages a floor for a vehicle cabin, said vehicle being of the type in which the hull structure comprises frames, positioned perpendicular to the longitudinal axis X of the vehicle's movement, the floor being formed from a juxtaposition of profiled elements of identical cross-section along a plane known as the longitudinal vertical plane XZ, but possibly of different lengths, and each comprising:

a chiefly planar elongated cross member, positioned in a plane known as the transverse vertical plane YZ, said cross member being designed to be attached at its two extremities to a support structure secured to the vehicle's frames, the cross members of various juxtaposed elements being on the same level along the vertical axis Z, a generally flat elongated panel, positioned in a plane known as the horizontal plane XY and comprising a region of overlap along one of its longitudinal edges (Y axis) and a bearing region along the other longitudinal edge, the overlap region and the bearing region being of similar width and of total thickness less than or equal to the mean thickness of the panel, said panel being perpendicular to the cross member, secured on one face, known as the underside, at least two points to said cross member substantially in line with the middle of the bearing region.

It is understood that the floor is formed of elements each comprising a flat portion, these flat portions being positioned in line with one another. An overlay region of these flat portions allows them to be attached together and the forces applied on each panel to be distributed over its cross member and over the neighboring cross member.

Preferably, the floor is designed for a vehicle of the type in which the frames are distributed at regular intervals over at least part of the vehicle's length along the longitudinal axis X, and in which, for at least some of the profiled elements, each cross member of a profiled element is attached directly to a hull structure frame.

It is understood that the support structure to which the profiled element's cross member is attached is a hull structure frame, if these frames are positioned at regular intervals, or, if this is not the case, an intermediate structure that is itself secured to the hull structure.

In a preferred mode of implementation, the elements are secured to neighboring elements in their overlap regions and bearing regions, once assembled.

In a preferred embodiment, each cross member comprises a stiffener positioned along the edge of said cross member opposite the flat panel.

In a preferred embodiment, the elements are made of a lightweight metal or metal alloy, each flat panel comprising on its underside at least one intermediate longitudinal stiffener.

According to another embodiment, the elements are made of composites, each flat panel comprising a honeycomb core.

In a second aspect, the invention envisages a floor element, designed to form a vehicle cabin floor by juxtaposition as described.

In yet another aspect, the invention envisages an aircraft of the type in which the fuselage structure is formed, firstly, of generally circular frames, positioned perpendicular to the longitudinal axis X of the airplane's movement, said frames being distributed at regular distances along this longitudinal axis X, secondly, of longitudinal stiffeners connecting these frames, comprising a floor as described above.

According to a preferred embodiment of the aircraft, the floor's cross members are positioned in a vertical plane XZ, perpendicular to the longitudinal axis X of the aircraft; each cross member is secured at both extremities on the same frame of the aircraft fuselage's structure at two points symmetrical with respect to a vertical plane of symmetry of the aircraft, and each element has a length calculated according to its positioning between the frames of the aircraft cabin.

The invention also relates to a method for assembling a floor on a hull structure of a section of vehicle hull, which comprises steps of:

producing the hull structure comprising the frames, cutting the profiled elements to predefined lengths and finishing their extremities, presenting a first profiled element in line with the frame on which it is to be attached, attaching this profiled element's cross member to the corresponding frame, adding profiled elements, one by one, next to the already assembled floor, and attaching the cross members of these various juxtaposed profiled elements to the corresponding frames at the same level along the vertical axis Z, each overlap region of a panel being placed above a bearing region of the following panel, securing two successive elements at said elements' overlap and bearing regions, presenting a cross member, with a standard "I" section and dimensions similar to the cross members of the profiled elements, under the overlap region of the last profiled element assembled, attaching it to the latter, and attaching it on the frame located at the same position along the airplane's longitudinal axis X.

BRIEF DESCRIPTION OF THE DRAWINGS

The goals and advantages of the invention will be better understood in reading the description and drawings of a particular embodiment, given as a non-limiting example, for which the drawings show.

DETAILED DESCRIPTION OF A PARTICULAR EMBODIMENT OF THE INVENTION

The invention finds its position in the front part of an airplane fuselage.

The following are defined for the rest of the description a longitudinal axis X oriented in the direction of the airplane's movement in level flight; a transverse axis Y in the horizontal plane and perpendicular to the longitudinal axis X; and a vertical axis Z. The terms anterior, posterior, front, rear, top, bottom, left, right will be used, with reference to these axes. The airplane considered here is of a type symmetrical with respect to a longitudinal vertical plane XZ.

Figure 1:
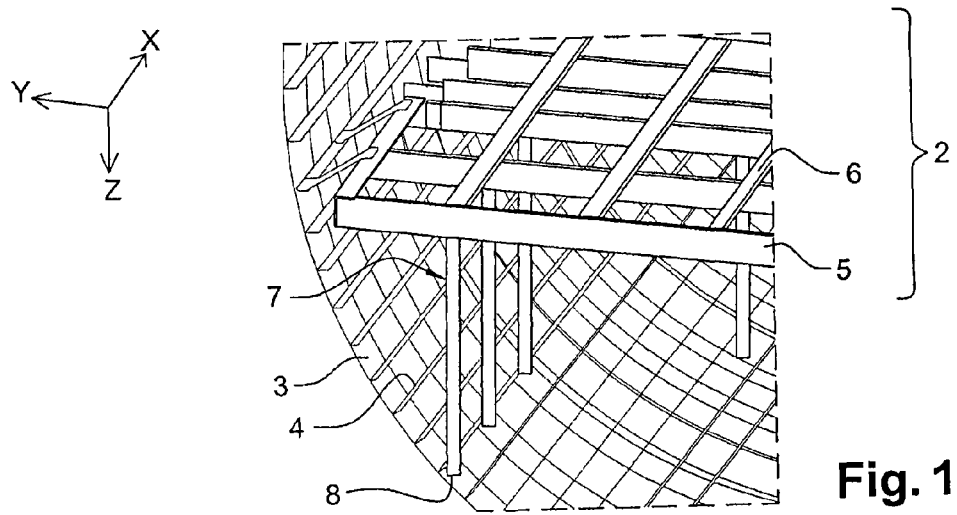
FIG. 1: an example of an aircraft fuselage in which a floor and a hull structure are assembled according to a method of the prior state of the art.
Figure 2A:
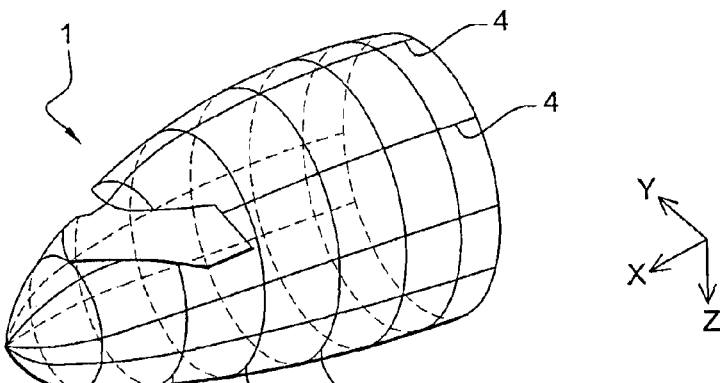
FIG. 2a: an example of a front hull structure of an aircraft.
Figure 2B:
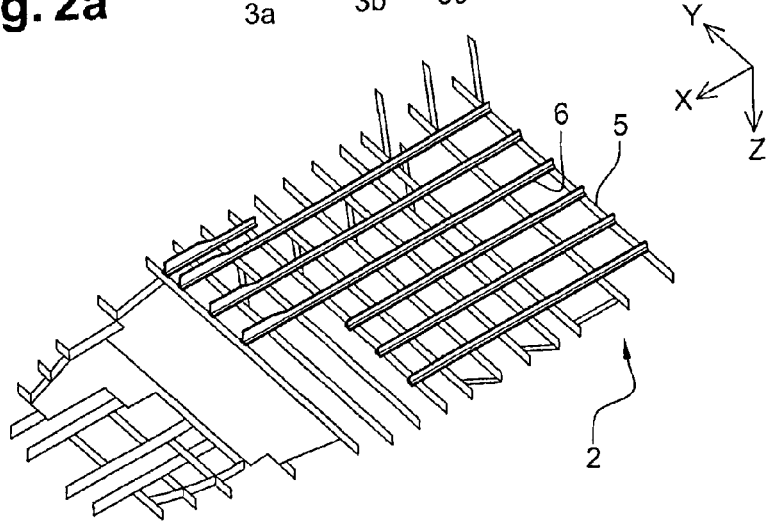
FIG. 2b: an example of a front floor of an aircraft according to the prior state of the art.

As previously described and illustrated by FIG. 2a, the fuselage of said aircraft comprises a hull structure 1 comprising frames 3 oriented substantially perpendicular to the longitudinal axis X, and longitudinal stiffeners 4 connecting the frames 3 to each other and oriented substantially parallel to this longitudinal axis X. In this example, it is assumed that the frames 3 are regularly spaced by a distance d over at least part of the length of the fuselage.

Figure 3:
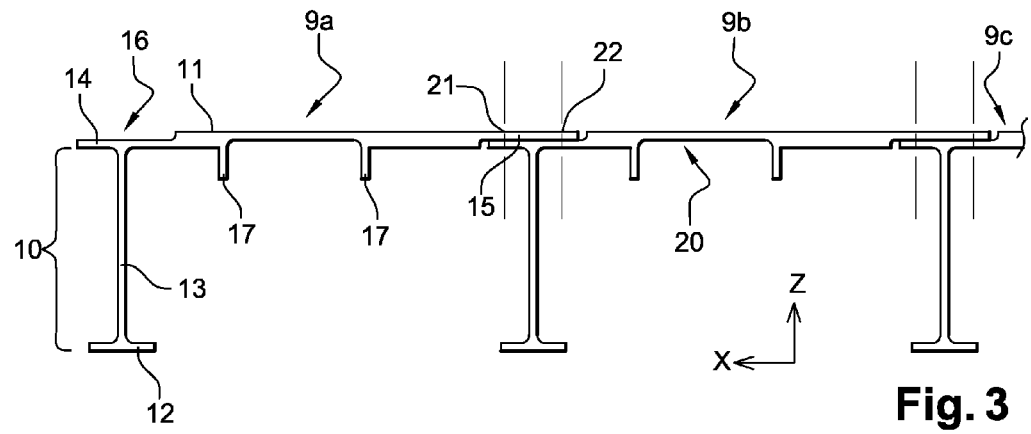
FIG. 3: cross-section view of the assembled modular floor elements according to the invention, in an embodiment made of metal alloy.

The floor 2 according to the invention, as illustrated in cross-section in FIG. 3, is realized by the juxtaposed assembly of at least two elongated profiled elements 9a, 9b, etc., positioned side by side perpendicular to the aircraft's longitudinal axis X.

These profiled elements 9a, 9b, 9c, etc. are of identical cross section.

Each of these profiled elements 9 comprises a cross member 10 with a standard "I" section, comprising a lower stiffener 12, known as the base plate, forming the stiffener, a core 13, flat, positioned in a transverse vertical plane YZ, said cross member 10 being designed to be attached at its two extremities onto a frame 3 of the aircraft fuselage's structure.

The cross member 10 of each profiled element 9 also comprises an upper stiffener 14, known as the head, which in the present invention forms an integral part of a generally flat elongated panel 11, positioned in a horizontal plane XY, to the lower surface of which the cross member 10 is thus secured.

In this non-limiting example, the width of the panel 11, and thus of each profiled element 9, is close to the distance d between two frames 3 of the hull structure 1, e.g. a few tens of centimeters, so as to allow, for each profiled element 9a, 9b, 9c, etc., both extremities of its cross member 10a, 10b, 10c to be attached at two points of a corresponding frame 3a, 3b, 3c, these points being substantially symmetrical along the aircraft's vertical plane of symmetry XZ.

The profiled elements 9a, 9b, 9c, etc. are possibly of different lengths, the length of each profiled element 9a, 9b, 9c, etc. depending on the width of the corresponding frame 3a, 3b, 3c, etc., and hence on the width of the hull structure 1 at the position where said profiled element must be installed. It is understood that the actual length of each profiled element 9 will in practice be slightly less than this width of the corresponding frame 3, to allow its attachment to said frame 3. The method of attaching elements on the corresponding frames is outside the framework of this invention and is therefore not described further herein.

Similarly, the exact geometry of the extremities of each profiled element 9 depends on its method of attachment to each frame 3 and is therefore not detailed here.

The panel 11 comprises along one of its longitudinal edges (extending along the Y axis) an overlap region 15, and, along the other longitudinal edge, a bearing region 16, the overlap region 15 and the bearing region 16 being of similar width and of total thickness less than or equal to the mean thickness of the panel 11.

In this example, the overlap region 15 is a part of the flat panel 11, reduced on its underside, but whose upper face is coplanar with the rest of the upper face of the flat panel 11. Similarly, in this example, the bearing region 16 is a part of the flat panel 11, reduced on its upper face, but whose lower face is coplanar with the rest of the lower face of the flat panel 11. These two overlap and bearing regions comprise holes 21, 22 respectively, corresponding when the overlap region 15 of a profiled element 9 is superimposed on the bearing region 16 of a neighboring profiled element 9.

The panel 11 and the cross member 10, are secured substantially in line with the middle of the bearing region 16, which practically coincides in this example with the head 14 of the cross member 10.

To increase its rigidity when it is subjected to a load on its upper surface, the flat panel 11 comprises on its underside two straight, vertical intermediate stiffeners 17 oriented in the transverse vertical plane YZ, the region 20 of the flat panel 11 located between these stiffeners 17 being, in this example, thinner. The intermediate stiffeners 17 substantially divide the width of the flat panel 11 into three equal parts.

In this example the profiled elements 9 are made of light alloy or aluminum, by techniques known to experts.

They are produced in a single beam of great length, then cut into shorter profiled elements 9 according to the lengths required for the assembly of a given floor.

The size and thickness of different parts of each profiled element 9 are calculated in a manner known to experts according to the mechanical loads to be withstood and dimensions of the aircraft hull structure 1 on which the floor 2 must be installed.

Method for Assembling a Floor

Assembling a floor 2 according to the invention comprises several steps. It is carried out after the positioning of the hull structure 1 comprising the frames 3, the stringers 4 and the outer skin, this positioning being performed in a way known to experts.

The assembly method then comprises presenting a first profiled element 9a in line with the frame 3a on which it is to be attached. The cross member 10a of this profiled element 9a is then attached by known means to the frame 3a.

Then, one by one, profiled elements $9_i$, which have been cut beforehand to a suitable length for their position in the cabin and whose extremities have been shaped with regard to their attachment, are placed next to the already assembled floor 2, and the cross members $10_i$ of these various juxtaposed profiled elements 9, are attached to the corresponding frames $3_i$ at the same level along the vertical axis Z, the flat panels 11, of these profiled elements $9_i$ thus being located in the same horizontal plane XY, and extending to form a horizontal floor, each overlap region $15_i$ of a panel being placed above a bearing region $16_{i-1}$ of the next panel.

During the positioning of these elements they are secured, for example, by riveting or bolting using the superimposed holes 21, 22 of the overlap region 15 and bearing region 16 of the successive elements.

Insulating washers 19 are possibly positioned in the interval between the overlap region 15 of one panel and the bearing region 16 of the next, during their assembly, to reduce vibration or allow some flexibility of assembly.

When the assembled floor 2 has reached the desired length a standard 'I'-section cross member, with similar dimensions to the cross members 10 of the profiled elements 9, is presented under the overlap region 15 of the last profiled element assembled, secured to it and attached to the frame 3 at the same position along the longitudinal axis X of the airplane.

Vertical braces 7 are possibly attached to some of the cross members 10 and the corresponding frames 3, according to the maximum loads to be borne on the floor 2, the decision to install these braces and their positions being determined by known means.

ADVANTAGES OF THE INVENTION

The floor according to the invention as described is particularly suited to the case of an aircraft cockpit, which comprises no floor rail for attaching passenger seats, unlike the passenger cabin.

Among the advantages of the aircraft floor according to the invention, it is understood that it removes the need for a complicated and complete installation of the floor before it is integrated into an already assembled hull section, and at the same time allows a floor to be positioned in a simple manner in a circumferentially closed shell structure.

Moreover, the floor and the installation method according to the invention allow play between the frames to be compensated for easily.

Finally, making the profiled section in a long length, which is then cut as required, generates significant production cost savings.

Variants

The scope of this invention is not limited to the details of the forms of embodiment considered above as an example, but on the contrary extends to modifications in the reach of the expert.

In a variant the profiled elements do not comprise holes 21, 22, and these are made during the juxtaposition of two profiled elements 9, when they are being secured. This arrangement allows elements to be assembled with the overlap and bearing regions offset slightly, thus allowing geometric errors in the structure or the floor to be compensated for.

A close variant is characterized by the fact that only the overlap regions 15 comprise holes 21 and the corresponding holes 22 in the bearing regions are made when the profiled elements 9 are assembled.

In another variant, there are different intervals between the frames 3 of the aircraft, and a floor 2 is produced by juxtaposing profiled elements 9 that are similar but have widths adapted to these different intervals, while retaining identical overlap and bearing regions, so as to enable easy assembly.

In this case, instead of a single source of profiled sections with width d, the assembly method uses several, with standardized widths according to the most frequent intervals between frames.

Still in the case where there are no regular intervals between the frames 3 of the hull structure 1, a positioning variant consists of using an intermediate support structure (not shown in the figures), for example realized as an elongated beam, comprising, on one of its sides, means of attaching cross members 10 of the profiled elements 9, and, on the other side, means of attachment onto the frames 3 of the aircraft's hull structure 1.

In one embodiment, the flat panel 11 and the cross member 10 are secured at a few points along the upper edge of said cross member 10.

Figure 4:
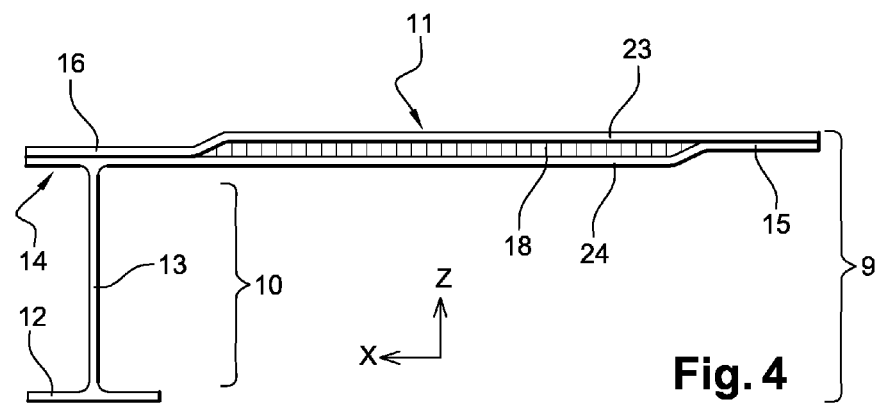
FIG. 4: a modular floor element, in an embodiment made of a composite.
Figure 5:
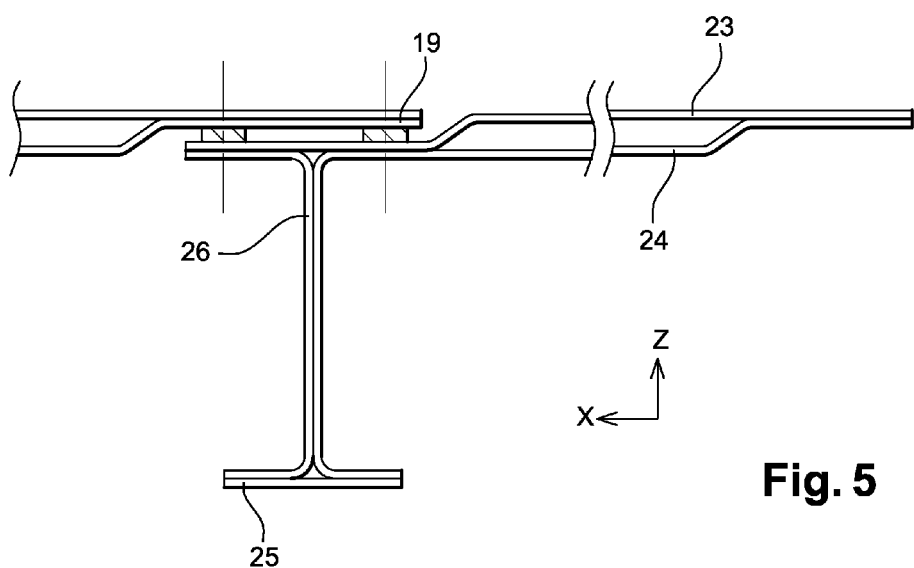
FIG. 5: detailed view of the assembly region two floor elements, in an embodiment made of a composite.

In an embodiment of the profiled elements 9, illustrated in FIG. 4, these are made of composites instead of aluminum or a light alloy.

In this variant, the flat panel 11 is, for example, formed from a standard honeycomb core 18 sandwiched between two blanks 23, 24 made of tapes of two-dimensional fibers held by a resin. The cross member is also produced by assembling blanks 24, 25, 26. The method of manufacturing such composites is known and is outside the framework of this invention.

These profiled elements 9 made of composites are then cut to the required length and assembled in a way substantially similar to that which has been described.

What is claimed is:

1. A floor for a vehicle cabin, said vehicle being an aircraft of the type including a hull structure that includes frames, positioned perpendicular to a longitudinal axis X that is in a movement direction of the aircraft, wherein the floor comprises:
    profiled elements, the floor being formed from a juxtaposition of the profiled elements that include an identical cross-section along a longitudinal vertical plane XZ, and each of the profiled elements including:
        a mainly planar elongated cross member, positioned in a transverse vertical plane YZ, said cross member including a lower stiffener that extends along the longitudinal axis X, said cross member being configured to be attached at two extremities of the cross member to a support structure secured to the aircraft's vehicle's frames, and cross members of the juxtaposed profiled elements being on a same level along a vertical axis Z, and
        a generally flat elongated panel, positioned in a horizontal plane XY and including an overlap region along one of its longitudinal edge (Y axis) of the elongated panel and a bearing region along another longitudinal edge of the elongated panel, the overlap region and the bearing region being of similar width and of total thickness less than or equal to a mean thickness of the elongated panel, said elongated panel being perpendicular to the cross member, and an underside of the bearing region is coplanar with a lower face of the elongated panel and is secured to said cross member at two or more points substantially in line with a middle of the bearing region.

2. The floor according to claim 1, said floor being designed for the aircraft of the type in which the frames are distributed at regular intervals over at least part of the aircraft's length along the longitudinal axis X, and in which, for at least some of the profiled elements, each cross member of a profiled element is attached directly to a frame of the hull structure.

3. The floor according to claim 1, wherein the profiled elements are secured to neighboring ones of the profiled elements in their overlap regions and bearing regions, once assembled.

4. The floor according to claim 1, wherein each cross member includes an upper a stiffener positioned along an edge of said cross member opposite the flat panel.

5. The floor according to claim 1, wherein the profiled elements are made of a lightweight metal or metal alloy, each flat panel including on an underside of the flat panel at least one intermediate longitudinal stiffener.

6. A profiled floor element, said floor element being configured to form by juxtaposition a vehicle cabin floor according to claim 1.

7. An aircraft of the type in which the structure of the fuselage is formed, firstly, of generally circular frames, positioned perpendicular to the longitudinal axis X of the airplane's movement, said frames being distributed at regular distances along this longitudinal axis X, and secondly, of longitudinal stiffeners connecting these frames,
    wherein the aircraft comprises a cabin floor according to claim 1.

8. The aircraft according to claim 7, wherein the cross members of the floor are positioned in a vertical plane XZ, perpendicular to the longitudinal axis X of the aircraft, each cross member being secured at both extremities of the cross member on the same frame of the aircraft fuselage's structure at two points symmetrical with respect to a vertical plane of symmetry of the aircraft, and each profiled element has a length calculated according to a positioning of the profiled element between the frames of the aircraft cabin.

9. A method for assembling a floor on a hull structure of a section of a hull of an aircraft, which comprises:
    producing the hull structure including frames of the aircraft,
    cutting profiled elements to predefined lengths and finishing extremities of the profiled elements,
    presenting a first one of the profiled elements in line with a first one of the frames on which the first one of the profiled elements is to be attached,
    attaching a cross member of the first one of the profiled elements to the first one of the frames, said cross member including a lower stiffener that extends along a longitudinal axis X of the aircraft,
    adding one or more additional profiled elements, one by one, next to an already assembled floor including the first one of the profiled elements, and attaching respective cross members of these juxtaposed profiled elements to corresponding frames at a same level along a vertical axis Z, each of the profiled elements including a panel with an overlap region and a bearing region, an underside of the bearing region being coplanar with a lower face of the panel and being secured to a respective cross member at two or more points substantially in line with a middle of the bearing region, so that an overlap region of a panel of one of the profiled elements is placed above a bearing region of a panel of a next one of the profiled elements,
    securing juxtaposed profiled elements at a respective overlap region and bearing region of said juxtaposed profiled elements, and
    presenting a standard "I"-section cross member, with similar dimensions to the cross members of the profiled elements, under an overlap region of a last one of the profiled elements assembled, and securing the "I"-section cross member to the last one of the profiled elements assembled and attaching the "I"-section cross member to one or more of the frames at a same position along the longitudinal axis X of the aircraft.

\* \* \* \* \*